Patented June 11, 1929.

1,716,822

UNITED STATES PATENT OFFICE.

ANGELO KNORR, OF BERLIN, AND ALBERT WEISSENBORN, OF POTSDAM, GERMANY, ASSIGNORS, BY MESNE ASSIGNMENTS, TO WINTHROP CHEMICAL COMPANY, INC., OF NEW YORK, N. Y., A CORPORATION OF NEW YORK.

PROCESS OF MAKING UNSATURATED ALDEHYDE AND THE PRODUCT THEREOF.

No Drawing. Application filed March 7, 1927, Serial No. 173,596, and in Germany July 2, 1926.

The present invention relates to a new process of producing unsaturated aldehydes and to the products obtainable thereby.

According to Miller and Kinkelin (Berichte der deutschen chemischen Gesellschaft, vol. 19, page 526) 1-oxo-propan (propionic aldehyde) may be condensed with benzaldehyde, dissolved in 8 times its weight of alcohol, on addition of 50 times its weight of water and aqueous sodium hydroxide solution. Thus 1-oxo-2-methyl-3-phenyl-propen-2 (α-methylcinnamic aldehyde) was formed. Under like conditions 3-nitrobenzaldehyde has been condensed with 1-oxopropan and this reaction, owing to the enhanced reactivity of the nitro aldehydes can be extended to the condensation with 1-oxobutan (n-butyric aldehyde) (see Miller and Rhode, Berichte der deutschen chem. Gesellschaft, vol. 22, page 1838); it fails, however, when the attempt is made to condense non-nitrated aromatic aldehydes with the higher homologues of 1-oxo-propan, because owing to the use of aqueous alkaline solution the formation of aldols occurs and that of 1-oxo-2-alkyl-3-aryl-propan-2 is completely suppressed.

An analogous saturated aldehyde, the 1-oxo-2-methyl-3-furyl-propen-2 could be obtained in an extremely diluted solution applying 1 part of furfurol, 2 parts of 1-oxopropan, 100 parts of water, 5 parts of sodium hydroxide solution of 10 per cent strength (see Schmidt, Berichte der deutschen chemischen Gesellschaft, vol. 14, page 574).

By the present invention the said inconveniences may be removed, the yield of the known derivatives of 1-oxo-2-alkyl-propen-2 being considerably improved.

Furthermore according to the invention a great number of new unsaturated aldehydes of the formula

R—CH=C—CH=O,
|
R′

R and R′ meaning organic radicals, can be obtained.

The invention is based upon the observation that in the condensation of aldehydes by alkaline agents the aldol formation may be counteracted by progressively diminishing the proportion of water present.

The process consists in condensing an aldehyde which has no $CH_2$-group in 2-position to the oxo-group with an aldehyde which contains a $CH_2$-group in the 2-position to the oxo-group, the operation being performed in the presence of an alkaline agent and organic solvent such as alcohols containing less than half its weight of water. The reaction occurs in accordance with the following formula

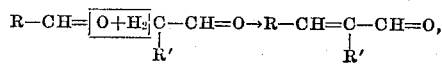

R and R′ meaning organic radicals.

Notwithstanding that the introduction of higher alkyl groups might be expected to be accompanied by diminution of the odor, it has been found that the 1-oxo-2-alkyl-3-arylpropen-2 is characterized by a strong, pleasant odor which differs fundamentally from that of 1-oxo-3-aryl-propen-2 (cinnamic aldehyde).

The unsaturated aldehydes thus obtained are more or less yellow compounds.

In order to illustrate, how the process is carried out, without limiting the invention the following examples are given the parts being by weight:—

*Example 1.*—250 parts of benzaldehyde are mixed with a solution of 15 parts of potassium hydroxide in 380 parts of dry ethyl-alcohol and into the mixture are dropped, in the course of 5 hours at 10° C., 100 parts of 1-oxo-propan (propionic aldehyde). The reaction is performed according to the formula

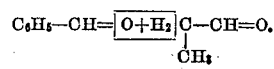

After separation of the condensing agent and the alcohol there is obtained by distillation in a vacuum, 216 parts of 1-oxo-2-methyl-3-phenyl-propen-2 (α-methylcinnamic aldehyde); this is a yield of 86 per cent of that theoretically possible calculated on the propionic aldehyde and of 81 per cent calculated on the benzaldehyde used.

*Example 2.*—235 parts of benzaldehyde are mixed with a solution of 15 parts of potassium hydroxide in 350 parts of ethyl-alcohol of 96 per cent strength and into the mixture are dropped in the course of 5 hours at 10° C. 100 parts of 1-oxo-butan (n-butyric aldehyde). The reaction is performed according to the formula

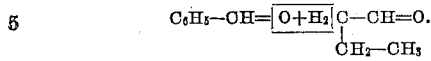

The mass is worked up as described in Example 1, whereby 180 parts of 1-oxo-2-ethyl-3-phenyl-propen-2 (α-ethylcinnamic aldehyde), boiling at 132–134° C. under 14 mm. pressure, are obtained. The yield amounts therefore to 80 per cent of the theoretical yield.

Instead of alcohol of 96 per cent strength alcohol with a higher content of water may be used. The operation may also be conducted by adding a mixture of benzaldehyde and 1-oxo-butan gradually to the condensing agent.

*Example 3.*—300 parts of benzaldehyde are mixed with a solution of 20 parts of potassium hydroxide in 480 parts of alcohol and there are dropped into the mixture, in the course of 5 hours, 100 parts of 1-oxo-3-methyl-butan (isovaleric aldehyde). The reaction is performed according to the formula

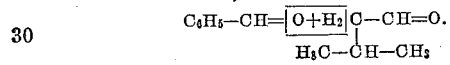

After separation of the solvent and condensing agent there is obtained in good yield 1-oxo-2-amyl-3-para-methoxyphenyl-propen-2 (α-amyl-4-methoxycinnamic aldehyde) in the form of a yellow red liquid which boils at 195–200° C. under 13 mm. pressure.

*Example 6.*—150 parts of 1-oxo-2-ethyl-

On distillation there is obtained as an intermediate distillate 1-oxo-2-isopropyl-3-phenyl-propen-2 (α-isopropylcinnamic aldehyde) in the form of a yellow liquid which boils at 133–135° C. under 13 mm. pressure.

*Example 4.*—300 parts of 4-methoxybenzaldehyde are mixed with a solution of 20 parts of potassium hydroxide and 480 parts of alcohol and into the mixture are dropped in the course of 5 hours at 10° C. 100 parts of 1-oxo-butan (n-butyric aldehyde). The reaction is performed according to the formula

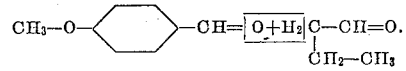

The mixture is worked up as described in Example 1, whereby there is obtained in good yield 1-oxo-2-ethyl-3-para-methoxyphenyl-propen-2 (α-ethyl-4-methoxycinnamic aldehyde) in the form of a yellow-red liquid which boils at 169–172° C. under 13 mm. pressure.

*Example 5.*—350 parts of 4-methoxybenzaldehyde are mixed with a solution of 20 parts of potassium hydroxide and 480 parts of alcohol and into the mixture are dropped in the course of 5 hours, 200 parts of 1-oxoheptan (oenanthic aldehyde). The reaction is performed according to the formula

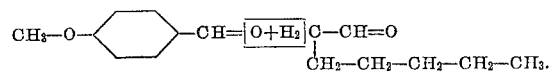

hexan are mixed with 12 parts of potassium hydroxide in 240 parts of ethyl alcohol and into the mixture are dropped in the course of 5 hours at 15° C. 100 parts of 1-oxo-heptan (oenanthic aldehyde). The reaction is performed according to the formula

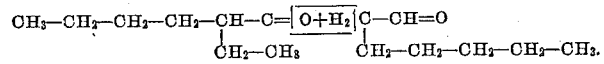

After separation of the condensing agent and solvent there is obtained by distillation in a vaccum a good yield of 1-oxo-2-amyl-4-ethyl-octen-2 in the form of a pale yellow liquid

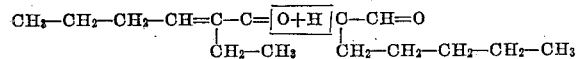

1-oxo-2-amyl-4-ethyl-octadien-2.4, a pale yellow liquid boiling at 150–155° C. under 10 mm. pressure.

*Example 7.*—33 parts of 1-oxo-3-phenyl-propen-2 (cinnamic aldehyde) are mixed with a solution of 13 parts of potassium hydroxide in 650 parts of ethyl alcohol and into the mixture are dropped in the course of 5 hours at 10–12° C. a mixture of 300 parts of 1-oxo-3-phenyl-propen-2 and 100 parts of 1-oxoboiling at 150–155° C. under 10 mm. pressure.

If in this example 1-oxo-2-ethylhexen-2 is substituted for 1-oxo-2-ethylhexan there is obtained according to the formula butan (n-butyric aldehyde). The reaction is performed according to the formula

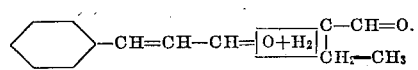

When the mixture is worked up as described in the preceding examples there are obtained 233 parts of 1-oxo-2-ethyl-5-phenyl-pentadien 2.4 in the form of a yellow liquid which boils at 172–180° C. under 12 mm. pressure.

In like manner other aldehydes may be condensed; for example there may be obtained from 1-oxo-3-phenyl-propen-2 (cinnamic aldehyde) and 1-oxo-propan (propionic aldehyde) 1-oxo-2-methyl-5-phenyl-pantadien-2.4, pale yellow crystals of melting point 58° C. and boiling point 170–180° C. under 15 mm. pressure;

from 1-oxo-3-phenyl-propen-2 (cinnamic aldehyde) and 1-oxo-heptan (oenanthic aldehyde) 1-oxo-2-amyl-5-phenyl-pentadien-2.4, a yellow liquid boiling at 203–210° C. under 15 mm. pressure;

from 1-oxo-2-methyl-3-phenyl-propen-2 (α-methyl-cinnamic aldehyde) and 1-oxo-propan (propionic aldehyde) 1-oxo-2.4-di-methyl-5-phenyl-pentadien-2.4, pale yellow crystals, melting point 43° C., boiling point 175–180° C. under 14 mm. pressure;

from 1-oxo-2-methyl-3-phenyl-propen-2 (α-methylcinnamic aldehyde) and 1-oxo-butan (n-butyric aldehyde) 1-oxo-2-ethyl-4-methyl-5-phenyl-pentadien-2.4, pale yellow crystals of boiling point 185–190° C. under 13 mm. pressure.

As aldehydes which can be condensed in accordance with the invention may be mentioned among others 1-oxo-buten-2, 1-oxo-2-methyl-propan, 1-oxo-2-phenyl-propan, 1-oxo-3-paratolyl-propen-2, 1-oxo-2-methyl-3-phenyl-propan, 4-methyl-benzaldehyde, 4-isopropylbenzaldehyde, piperonal, cyclo-citral, furfurol on the one hand and 1-oxo-3-phenyl-propan, 1-oxo-3-oxy-butan, 1-oxo-nonan, 1-oxo-undecan on the other hand.

We do not claim 1-oxo-2-methyl-3-phenyl-propen-2, 1-oxo-2-methyl-3-meta-nitro-phenyl-propen-2, 1-oxo-2-ethyl-3-meta-nitro-phenyl-propen-2 and 1-oxo-2-methyl-3-furyl-propen-2, as these compounds are known.

What we claim is:

1. The process which comprises condensing in the presence of an alkaline acting agent and an organic solvent containing less than half its weight of water an aldehyde which has no $CH_2$ group in 2-position to the oxo group with an aldehyde which contains a $CH_2$ group in the 2-position to the oxo group.

2. The process which comprises condensing in the presence of potassium-hydroxide and an aliphatic alcohol of low molecular weight containing less than half its weight of water an aldehyde which has no $CH_2$ group in the 2-position to the oxo group with an aldehyde which contains a $CH_2$ group in the 2-position to the oxo group.

3. The process which comprises condensing in the presence of an alkaline acting agent and an organic solvent containing less than half its weight of water a compound of the general formula:

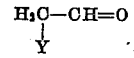

wherein X represents hydrogen or alkoxy group with a compound of the general formula:

wherein Y represents an alkyl group.

4. The process which comprises condensing in the presence of potassium-hydroxide and an aliphatic alcohol of low molecular weight containing less than half its weight of water a compound of the general formula:

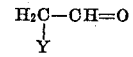

wherein X represents hydrogen or an alkoxy group with a compound of the general formula:

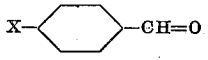

wherein Y represents an alkyl group.

5. The process which comprises condensing a compound of the general formula:

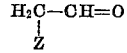

wherein X represents hydrogen or an alkoxy group with a compound of the general formula:

$$H_2C-CH=O$$
$$|$$
$$Z$$

wherein Z represents a methyl or ethyl group in the presence of potassium-hydroxide and ethyl alcohol containing less than half its weight of water.

6. The process which comprises mixing about 235 parts of benzaldehyde with a solution of about 15 parts of potassium-hydroxide in about 350 parts of ethyl alcohol and dropping into the mixture at a temperature of about 10° C. about 100 parts of a compound of the general formula:

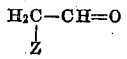

wherein Z represents a methyl or ethyl group.

7. As new products the compounds of the general formula:

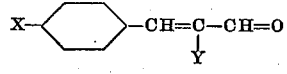

wherein X represents hydrogen or an alkoxy group and Y represents an alkyl group containing 2 to 5 carbon atoms.

8. As a new product 1-oxo-2-ethyl-3-phenyl-propen-2 of the probable formula:

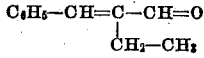

a yellow liquid boiling at 132–134° C. under 14 mm. pressure.

In testimony whereof we affix our signatures.

Dr. ANGELO KNORR.
Dr. ALBERT WEISSENBORN.

Certificate of Correction.

Patent No. 1,716,822. Granted June 11, 1929, to

ANGELO KNORR ET AL.

It is hereby certified that error appears in the printed specification of the above numbered patent requiring correction as follows: Page 1, line 28, for the word "saturated" read *unsaturated*; page 2, after line 82, in the formula, for the boxed portion $$\boxed{O+H} \text{ read } \boxed{O+H_2};$$

and that the said Letters Patent should be read with these corrections therein that the same may conform to the record of the case in the Patent Office.

Signed and sealed this 13th day of August, A. D. 1929.

[SEAL]

M. J. MOORE,
*Acting Commissioner of Patents.*